United States Patent Office 3,173,937
Patented Mar. 16, 1965

3,173,937
MANUFACTURE OF ARSINIC ACIDS
Robert M. Moyerman, Menominee, Mich., and Philip J. Ehman, Marinette, Wis., assignors to The Ansul Company, a corporation of Wisconsin
No Drawing. Filed Sept. 27, 1962, Ser. No. 226,725
16 Claims. (Cl. 260—442)

This invention relates to the preparation of arsinic acid compounds and more particularly to a process for making arsinic acid compounds from arsenoso substituted organic compounds.

Organic arsinic acids may be regarded as derived from inorganic arsenic acid by the replacement of two hydroxyl groups with univalent hydrocarbon radicals. They are, in general, white, crystalline substances which have found utility as pharmaceuticals and as herbicides.

Arsinic acids may be represented by the following structural formula:

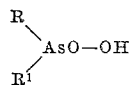

wherein R and R¹ are univalent hydrocarbon groups. The hydrocarbon groups R and R¹ may be substituted or unsubstituted, and they may be the same of different. Thus, R and R¹ may be saturated aliphatic hydrocarbon groups of the alkyl series, i.e., $C_nH_{2n+1}$, such as methyl, ethyl, n-propyl, n-butyl, isobutyl, pentyl, hexyl, heptyl, and so forth; aliphatic hydrocarbon groups of the alkenyl series, i.e., $C_nH_{2n-1}$, such as allyl and so forth; aliphatic hydrocarbon groups of the alkynyl series, i.e., $C_nH_{2n-3}$, such as ethnyl, propargyl, and the like; and aromatic hydrocarbon groups, such as benzyl, phenyl, naphthyl, and the like and including alkyl aryl and aryl alkyl groups. As already indicated the hydrocarbon group may be substituted with halogen, nitrogen, sulfur, and other common substituents. For example, the hydrocarbon groups R and R¹ may be heterocyclic nitrogen rings, such as those derived from pyridine, pyrrole, pyrrolidine, piperidine, morpholine, and the like, with the provision, however, that it is a carbon-arsenic bond which is formed and not a nitrogen-arsenic bond.

The arsinic acids are amphoteric and form salts with both acids and bases, including basic salts. Typical of the basic salts of arsinic acids are the water soluble alkali and alkaline earth metal salts, such as the sodium, lithium, potassium, calcium, barium and magnesium salts. Also may be mentioned the copper, iron, mercury, zinc and aluminum salts. As an example of the acid salts of arsinic acids may be mentioned the reaction product of dimethylarsinic acid and hydrochloric acid, i.e., $(CH_3)_2AsO_2H$—HCl. The reaction products between arsinic acids and other acids, such as nitric acid, sulfuric acid, and the like may also be mentioned. Arsinic acids also form esters with alcohols and organic acid anhydrides. All of the described compounds and others, which are well understood in the art, including the arsinic acids, per se, come within the general term arsinic acid compounds.

In preparing the simplest arsinic acid, dimethylarsinic acid, also called cacodylic acid, a typical procedure involves treating sodium arsenite with a methylating agent such as a methyl halide or dimethyl sulfate and acidifying to form the methanearsonic acid, reducing with sulfur dioxide, adding sodium hydroxide to prepare disodium methanearsonite and again reacting with a methylating agent to yield the sodium salt of cacodylic acid. The free acid may be obtained by the usual well-known procedures.

The general reaction mechanism for the preparation of organic arsenicals of the type under discussion is well known in the art and a portion of the procedure is described in U.S. Patent 2,442,372.

The general method has a number of advantages, particularly where it is desired to prepare arsinic acids in which the organic radicals are not the same, for example, methylethylarsinic acid, methylbutylarsinic acid, butylphenyllarsinic acid, and so forth. However, despite its numerous advantages, this method has not been extensively used commercially because of low yields on the second step (see Banks et al, J. Am. Chem. Soc., 69, 927), and also because of the undesired production of by-products which are extremely hazardous and toxic and which are formed by disproportionation and/or decomposition of intermediate arsenoso compounds.

It is an object of this invention to provide a commercial process for the preparation of arsinic acids and salts thereof.

It is a further object of this invention to provide a commercial process for making arsinic acid compounds in high yields.

It is still a further object of this invention to provide a process for the preparation of arsinic acid compounds which substantially eliminates or holds formation of toxic and hazardous by-products to a minimum.

A further object of this invention is to provide a method for inhibiting disproportionation and decomposition of arsenoso substituted hydrocarbons used as intermediates in the production of arsinic acid compounds.

Other objects of the present invention will in part be obvious and will in part appear hereinafter.

When an arsenoso substituted hydrocarbon, i.e., an organic arsenic oxide, of the formula R—As=O is maintained in strongly alkaline media having a pH above about 10.5, reactions occur which may be represented as follows:

$$3R-As=O \rightarrow As_2O_3 + R_3As \qquad (1)$$
$$4RAs=O \rightarrow R_2AsOAsR_2 + As_2O_3 \qquad (2)$$

In preparing arsinic acids from arsenoso substituted hydrocarbons, these disproportionation reactions lead to a substantial reduction in yield and render the process uneconomical from a commercial point of view. Moreover, the products of the disproportionation may include volatile and spontaneously inflammable in air trisubstituted arsines, i.e., $R_3As$, and include oxidation products in the form of toxic gases or oils possessing a highly disagreeable odor.

According to the present invention, it has been discovered that the disproportionation reactions (1) and (2) may be suppressed or substantially eliminated and that arsinic acid compounds may be produced in surprisingly high yields by reacting arsenoso substituted organic compounds corresponding to the formula RAS=O with an alkylating agent in an alkaline environment substantially free of oxygen.

The arsenoso substituted organic compounds which serve as starting materials correspond to the formula R—As=O, where R is a univalent hydrocarbon radical of the type described hereinabove. Usually the arsenoso substituted organic compound will be present in an aqueous environment.

The oxygen may be removed from the reaction medium by purging with a gas inert to the arsenoso substituted hydrocarbon, such as nitrogen, argon, neon, krypton, and the like. Alternatively, the alkylating agent itself may be used as the purge gas. Also, if desired, the oxygen may be removed by evacuation followed by purging, and the evacuation-purge cycle may be repeated until substantial elimination of oxygen has been achieved.

In general, the oxygen content of the atmosphere imposed on the reaction mixture should be less than about $300 \times 10^{-5}$ moles per liter and preferably less than about $160 \times 10^{-5}$ moles per liter. Especially good results are obtained when the oxygen content of the atmosphere is less than about $70 \times 10^{-5}$ moles per liter.

From the foregoing it is evident that the amount of oxygen in the reactor must be reduced to a very low level. It is especially important that the oxygen/organic arsenic ratio be very small, i.e., that the amount of oxygen present be very small relative to the amount of arsenic present as R—As=O. In general the quantity of oxygen should be less than about $200 \times 10^{-5}$ moles per mole of R—As=O and preferably less than about $125 \times 10^{-5}$ moles per mole of R—As=O. Especially good results are obtained when the amount of oxygen is less than about $55 \times 10^{-5}$ moles per mole of R—As=O.

In carrying out the reaction, it is desirable that the aqueous solution of the arsenoso substituted organic compound be maintained at a pH less than about 10 and preferably less than about 7, until the oxygen content has been reduced to the desired level. Following removal of the oxygen, the pH of the reaction mixture is adjusted to the alkaline range, as by the addition of an alkali metal hydroxide. Preferably, the pH may be regulated following oxygen removal by adding an alkali metal hydroxide, such as sodium, potassium or lithium hydroxide. Enough of the alkali metal hydroxide is added to insure a large stoichiometric excess, based upon the arsenoso substituted hydrocarbon. Because of the large excess of alkali metal hydroxide employed, the pH of the reaction mixture at the start of alkylation will ordinarily be about 14. As the alkylation reaction progresses, the pH gradually falls until the alkylation is complete, at which time the pH is between about 5.5 and 6.5.

The alklating agents suitable for use in the present invention are those organic substances which contain a univalent hydrocarbon radical $R^1$ and a group such as sulfate or halide which is capable of entering into an addition reaction with arsenoso substituted hydrocarbons.

Typical alkylating agents may be represented by the formula $(R^1)_n X$ wherein $R^1$ is a univalent hydrocarbon radical, X is a reactive anion, and n corresponds to the valence of the anion.

Such alkylating reagents include the alkyl halides represented by the formula $R^1 X$ wherein X is a halide, i.e. chloride, bromide and iodide, and $R^1$ is a univalent hydrocarbon radical of the type described hereinabove.

Among the alkyl halides which may be used are methyl chloride, methyl bromide, methyl iodide, ethyl chloride, ethyl bromide, ethyl iodide, n-propyl chloride, n-butyl chloride, and isobutyl chloride. Other suitable alkylating agents which may be used include halo-aromatic compounds, such as the halobenzenes, e.g., iodobenzene, bromobenzene and the like. The term alkylating agent as used herein is broad enough to include compounds capable of adding both an alkyl and an aryl radical to the arsenoso substituted hydrocarbons.

Also suitable as alkylating agents are the dialkyl sulfates corresponding to the formula $R^1OSO_2OR^1$, or, alternatively, $(R^1)_2SO_4$. Here again, $R^1$ is a univalent hydrocarbon radical of the type described hereinabove. Such materials include dimethyl sulfate, diethyl sulfate, diphenyl sulfate, and the like.

The method of the present invention will be made clear from the following examples which, although illustrative, are not intended to limit the scope of the invention except as such limitations may appear in the claims.

EXAMPLE 1

By a process well known in the art and described in U.S. Patent 2,442,372, a solution of disodium methanearsonate was prepared from arsenic trioxide, sodium hydroxide and methyl chloride. The disodium methanearsonate produced was then reduced by the well known process involving calcium chloride and sulfur dioxide, and the calcium sulfate filtered off leaving a solution of arsenosomethane ($CH_3As=O$) at a pH of less than 7. This procedure is also described in the cited patent. Thirty-four hundred (3400) grams of the solution was charged to an agitated pressure reactor which had an internal reactor volume of 5480 ml. The charge volume amounted to 2700 ml. so that the volume of the space above the charge was 2780 ml. The charge had the following approximate analysis:

| | Gram moles |
|---|---|
| Arsenosomethane | 3.54 |
| Arsenic trioxide | 0.164 |
| Calcium chloride | 0.221 |
| Sulfur dioxide | 0.117 |

As long as the pH of the charge solution was less than 10, no decomposition or disproportionation was noted.

The pressure reactor was then sealed and evacuated to 15 mm. mercury absolute pressure followed by introduction of methyl chloride to a pressure of about 5 p.s.i. gauge. The evacuation-purging step was repeated three times to reduce the oxygen content in the vessel to a very low level. The calculated amount of oxygen in the reactor following the evacuation and pressurizing cycle was calculated as $5 \times 10^{-9}$ moles. Methyl chloride was then introduced to the reactor and for the remainder of the process a positive pressure of methyl chloride was maintained to eliminate any possible leaks of air into the reactor.

Eight hundred and seven (807) grams of a 50 percent aqueous solution of sodium hydroxide (10.07 moles) was pumped into the reactor, the agitator was started, and additional methyl chloride added to maintain the positive pressure. The temperature was raised to about 80° C. and additional methyl chloride supplied until the excess sodium hydroxide was neutralized, i.e., an end point pH of about 5.5 to 6.5 was reached. The reaction solution containing the product was worked up in the usual manner well known to the art. Based on arsenic, about 98 percent of the arsenosomethane was converted into cacodylic acid.

It will be noted in the foregoing example considerable care was taken to eliminate any air or oxygen containing gas from the presence of the arsenosomethane solution prior to making that solution alkaline, a procedure which resulted in the near theoretical yield realized.

EXAMPLE 2

To further illustrate the effect of air or other oxygen containing gas on the process, a series of runs was made in which the careful evacuation-methyl chloride purge-evacuation cycle was replaced by a single evacuation to a predetermined pressure, this being the only modification of the process of Example 1.

In each of the runs, the reactor charge and charge volume was the same as in Example 1. The acidic arsenosomethane solution was placed, at about room temperature, in the pressure reactor. The reactor was then sealed and the pressure reduced to the absolute pressure indicated in Table 1 below. The sodium hydroxide solution was then added and from this point the procedure of Example 1 repeated. In the product analysis, the methanearsonate, orthoarsenate and chloride ions were precipitated as silver salts and the filtrate titrated potentiometrically for dimethyl arsinic acid. Table 1 shows the results obtained:

*Table 1*

| Run No. | Evacuated to mm. Hg | Total [a] Oxygen Present Mol×10⁵ | Oxygen Present Mol×10⁵/ liter of head space | Oxygen Present Mol×10⁵/ Mol Arsenic Present [b] | Methyl Chloride Added Mol | Filtrate Weight, G. | Recovered Cacodylic Acid, Mol | Percent Yield |
|---|---|---|---|---|---|---|---|---|
| 1 | 160 | 434 | 155 | 123 | 7.49 | 3,976 | 1.12 | 31.6 |
| 2 | 124 | 326 | 117 | 92 | 7.35 | 3,821 | 1.57 | 44.5 |
| 3 | 113 | 293 | 105 | 88 | 7.88 | 4,121 | 2.07 | 58.5 |
| 4 | 100 | 254 | 91 | 72 | 7.27 | 3,513 | 2.80 | 79.0 |
| 5 | 80 | 194 | 70 | 55 | 7.58 | 3,951 | 3.12 | 88.0 |
| 6 | 18 | 9 | 3 | 2.5 | 7.39 | 4,139 | 3.50 | 99.0 |
| 7 | (c) | (d) |  |  | 7.31 | 3,764 | 3.50 | 99.0 |

[a] The vapor pressure of the contents was assumed to be 15 mm. Hg.
[b] As R—As=O.
[c] Evacuated to 25 mm., methyl chloride added to 760 mm., evacuated to 25 mm., methyl chloride added to 760 mm., evacuated to 15 mm.
[d] Actual calculated amount is 0.000000005 mol.

Referring to the Table, it will be observed that as the pressure was reduced below 160 mm. Hg absolute in the critical oxygen elimination step, the conversion increased sharply. Evacuation to about 18 mm. mercury absolute produced a yield of about 99 percent.

EXAMPLE 3

For comparison purposes, the procedure of Example 1 was repeated with the evacuation step eliminated completely. The product recovered from this run consisted almost entirely of methanearsonic acid, indicating almost complete disproportionation of the arsenosomethane prior to methylation.

EXAMPLE 4

Example 2 was repeated using arsenosoethane as the starting material. A similar increase in yield of ethylmethyl arsinic acid with reduction in oxygen content is obtained.

EXAMPLE 5

Example 2 was repeated using arsenosobenzene as the starting material. A similar increase in yield of phenyl methyl arsinic acid with reduction in oxygen content was obtained.

EXAMPLE 6

Example 2 was repeated using arsenosomethane as the starting material and benzylbromide as the alkylating agent. A similar increase in yield of benzylmethyl arsinic acid with reduction in oxygen content was obtained.

The invention in its broader aspects is not limited to the specific processes and steps described, but departures may be made therefrom within the scope of the accompanying claims without departing from the principles of the invention and without sacrificing its chief advantages.

What is claimed:

1. In a process for preparing arsinic acid compounds by reacting at alkaline pH an arsenoso substituted organic compound of the formula R—As=O wherein R is a member selected from the group consisting of univalent hydrocarbon radicals, substituted univalent hydrocarbon radicals, and heterocyclic nitrogen containing rings having a carbon atom bonded to the arsenic atom and selected from the group consisting of pyridine, pyrrole, pyrrolidine, piperidine and morpholine, with an agent selected from the group consisting of alkyl halides, bromobenzene, iodobenzene, dialkyl sulfates, and diaryl sulfates, the improvement for increasing the yield of the arsinic acid compound which comprises conducting the reaction in an environment which has an oxygen content of less than about $300 \times 10^{-5}$ mols per liter.

2. The improvement of claim 1 wherein the arsenoso substituted organic compound before commencement of the reaction is maintained at a pH of less than about 10.

3. The improvement of claim 1 wherein the pH of the arsenoso substituted organic compound is maintained at pH less than 7 until the oxygen content of the environment has been reduced to below $300 \times 10^{-5}$ mols per liter, and then raised to the alkaline range.

4. The improvement of claim 1 wherein the pH during reaction is maintained at about 14.

5. The improvement of claim 1 wherein an alkaline pH is maintained during reaction by addition of alkali metal hydroxide.

6. The improvement of claim 1 wherein enough alkali metal hydroxide is added during reaction to insure a stoichiometric excess, based upon the arsenoso substituted organic compound.

7. The improvement of claim 1 wherein the environment during reaction contains less than about $70 \times 10^{-5}$ mols of oxygen per liter.

8. The improvement of claim 1 wherein the quantity of oxygen present during reaction is less than about $200 \times 10^{-5}$ mols per mol of the arsenoso substituted organic compound.

9. The improvement of claim 1 wherein the amount of oxygen present during reaction is less than about $125 \times 10^{-5}$ moles per mol of the arsenoso substituted organic compound.

10. The improvement of claim 1 wherein the agent is a member selected from the group consisting of alkyl chlorides, alkyl bromides, alkyl iodides, bromobenzene and dialkyl sulfates.

11. The improvement of claim 1 wherein the arsenoso substituted organic compound is arsenosomethane.

12. The method of claim 1 wherein the arsenoso substituted organic compound is arsenosomethane and wherein the agent is a member selected from the group consisting of methyl chloride, methyl bromide and dimethyl sulfate.

13. In a process for preparing arsinic acid compounds corresponding to the structural formula

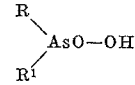

wherein R is a member selected from the group consisting of univalent hydrocarbon radicals, substituted univalent hydrocarbon radicals, and heterocyclic nitrogen containing rings having a carbon atom bonded to the arsenic atom and selected from the group consisting of pyridine, pyrrole, pyrrolidine, piperidine, and morpholine, and $R^1$ is a member selected from the group consisting of univalent alkyl and aryl hydrocarbon radicals and substituted univalent alkyl and aryl hydrocarbon radicals, by reacting, at alkaline pH an arsenoso substituted organic compound of the formula R—As=O in which R corresponds to R in said structural formula with an agent selected from the group consisting of alkyl halides, bromobenzene, iodobenzene, dialkyl sulfates, and diaryl sulfates, the improvement for increasing the yield of the arsinic acid compound which comprises conducting the reaction in an environment which has an oxygen content of less than about $300 \times 10^{-5}$ mols per liter.

14. In a method of preparing dimethylarsinic acid by reacting at alkaline pH, arsenosomethane with a member selected from the group consisting of methyl chloride, methyl bromide, methyl iodide and dimethyl sulfate, the improvement for increasing the yield of dimethyl arsinic acid which comprises conducting the reaction in an environment having an oxygen content of less than about $300 \times 10^{-5}$ mols per liter.

15. In a method of preparing arsinic acid compounds corresponding to the structural formula

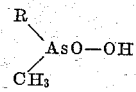

wherein R is a member selected from the group consisting of univalent alkyl hydrocarbon radicals, substituted univalent alkyl hydrocarbon radicals and by reacting, at alkaline pH, arsenosomethane with an agent selected from the group consisting of alkyl halides and substituted alkyl halides, the improvement for increasing the yield of the arsinic acid compounds which comprises conducting the reaction in an environment having an oxygen content of less than about $300 \times 10^{-5}$ mols per liter.

16. In a process for preparing arsinic acid compounds corresponding to the structural formula

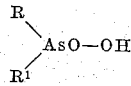

wherein R and $R^1$ are members selected from the group consisting of univalent hydrocarbon radicals, substituted univalent hydrocarbon radicals, and heterocyclic containing nitrogen rings having a carbon atom bonded to the arsenic atom and selected from pyridine, pyrrole, pyrrolidine, piperidine, and morpholine, by reacting at alkaline pH an arsenoso substituted organic compound of the formula R—As=O, wherein R corresponds to R of said structural formula with an agent containing a group $R^1$ which corresponds to $R^1$ of said structural formula, said agent being capable of entering into a reaction with the arsenoso substituted organic compound so as to form an arsinic acid compound, the improvement for increasing the yield of the arsinic acid compound which comprises maintaining in the environment in which the reaction is carried out an oxygen content of less than about $300 \times 10^{-5}$ mols per liter.

No references cited.

TOBIAS E. LEVOW, *Primary Examiner*.

UNITED STATES PATENT OFFICE
CERTIFICATE OF CORRECTION

Patent No. 3,173,937                                              March 16, 1965

Robert M. Moyerman et al.

It is hereby certified that error appears in the above numbered patent requiring correction and that the said Letters Patent should read as corrected below.

Column 1, line 27, for "of" read -- or --; column 2, line 62, for "RAS=O" read -- $RAs=O$ --; column 4, line 16, for "($CH_3Ac=O$)" read -- ($CH_3As=O$) --.

Signed and sealed this 19th day of October 1965.

(SEAL)
Attest:

ERNEST W. SWIDER                                           EDWARD J. BRENNER
Attesting Officer                                               Commissioner of Patents